(12) United States Patent
Hoppen

(10) Patent No.: US 7,019,910 B2
(45) Date of Patent: Mar. 28, 2006

(54) INSPECTION MICROSCOPE AND OBJECTIVE FOR AN INSPECTION MICROSCOPE

(75) Inventor: Gerhard Hoppen, Wetzlar (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 0 days.

(21) Appl. No.: 10/115,001

(22) Filed: Apr. 4, 2002

(65) Prior Publication Data

US 2002/0186463 A1 Dec. 12, 2002

(30) Foreign Application Priority Data

Apr. 6, 2001 (DE) .............................. 101 17 167

(51) Int. Cl.
G02B 21/02 (2006.01)

(52) U.S. Cl. .................... 359/656; 359/355; 359/368

(58) Field of Classification Search ................ 359/368, 359/356, 355, 357, 385, 656, 657, 658, 659, 359/660, 661
See application file for complete search history.

(56) References Cited

U.S. PATENT DOCUMENTS

| | | | | |
|---|---|---|---|---|
| 5,103,341 | A | 4/1992 | Ulrich | 359/657 |
| 5,105,147 | A | 4/1992 | Karasikov et al. | 324/537 |
| 5,144,475 | A * | 9/1992 | Hayashi | 359/355 |
| 5,469,299 | A | 11/1995 | Nagano | 359/661 |
| 5,717,518 | A | 2/1998 | Shafer et al. | 359/357 |
| 6,181,480 | B1 | 1/2001 | Ito | 359/656 |
| 6,236,503 | B1 | 5/2001 | Kaczynski et al. | 359/391 |
| 6,451,462 | B1 | 9/2002 | Schuster | 428/696 |
| 6,683,729 | B1 * | 1/2004 | Schuster | 359/656 |

FOREIGN PATENT DOCUMENTS

| | | |
|---|---|---|
| DE | 39 17 260 | 12/1989 |
| DE | 39 15 868 A1 | 11/1990 |
| DE | 298 315 A5 | 2/1992 |
| DE | 691 10 323 T2 | 10/1995 |
| DE | 197 42 802 | 10/1998 |
| DE | 197 31 291 C2 | 4/2000 |
| DE | 199 31 949 A1 | 1/2001 |
| EP | 0 857 985 A1 | 8/1998 |
| EP | 1067420 A2 * | 1/2001 |
| JP | 2000-105340 | 4/2000 |

OTHER PUBLICATIONS

English Translation of EP1067420A2.*
Peter A. Heimann et al., "Deep Ultraviolet Microscope", Applied Optics, vol. 29, No. 4, XP000094489, Feb. 1, 1990, pp. 495-501.

* cited by examiner

Primary Examiner—Thong Nguyen
Assistant Examiner—Arnel C. Lavarias
(74) Attorney, Agent, or Firm—Foley & Lardner LLP

(57) ABSTRACT

An inspection microscope (1) having a light source (3) that emits light of a first wavelength below 400 nm for illumination of a specimen (13) to be inspected, and having an objective (11) that is composed of multiple optical components and has a numerical aperture and a focal length, and having a tube optical system (21) and an autofocus device (25) that directs light of a second wavelength onto the specimen (13), is disclosed. The inspection microscope (1) is characterized by the objective (11), which has an optical correction that eliminates the longitudinal chromatic aberrations with respect to the first and the second wavelength and whose optical components are assembled in cement-free fashion, the second wavelength being greater than 400 nm.

20 Claims, 9 Drawing Sheets

INSPECTION MICROSCOPE AND OBJECTIVE FOR AN INSPECTION MICROSCOPE

CROSS REFERENCE TO RELATED APPLICATIONS

This invention claims priority of the German patent application 101 17 167.6-42 which is incorporated by reference herein.

FIELD OF THE INVENTION

The invention concerns an inspection microscope. The invention further concerns an objective used with the inspection microscope.

BACKGROUND OF THE INVENTION

In the semiconductor industry, inspection microscopes are used for the examination and inspection of wafers, masks, and semiconductor modules during the various phases of their production. Inspection microscopes are for the most part largely automated. This encompasses, inter alia, automatic transport and handling systems for the modules or wafers to be examined, as well as an automatic focusing capability.

Inspection microscopes are described, for example, in the German patent documents DE 39 17 260 "Wafer inspection device" and DE 197 42 802 C1 "Microscope stand for a wafer inspection microscope."

The optical resolution capability of a microscope depends on the wavelength of the illuminating light and the numerical aperture of the objective. The smaller the feature to be resolved, the shorter the illuminating light wavelength that must be selected, since the numerical aperture of the objectives cannot be increased indefinitely. For dry objectives, numerical apertures of no more than 0.9 to 0.95 can be attained. The size of the features on wafers for highly integrated circuits necessitates the use of ultraviolet light. Illuminating wavelengths between 248 nm and 365 nm are common at present.

Standard objectives are operated in the visible region of the light spectrum, i.e. in the spectral region from 400 nm to 800 nm. Standard objectives are unsuitable for applications with ultraviolet light, since the transmittance of standard objectives decreases dramatically the further into the ultraviolet the selected wavelength lies.

An objective that is achromatic in both the visible and the ultraviolet region is disclosed in the Japanese Patent having publication number JP2000105340 A. This objective is made of at least three different types of glass that contain barium fluoride, the lens elements being assembled into several groups of which the first, second, and fourth have positive refractive power while the third group has negative refractive power.

Irradiation with extremely short-wave ultraviolet light results in damage both to standard objectives and to special objectives that were in fact manufactured for the ultraviolet region. In standard objectives this damage is attributable, inter alia, to phototropic effects in the glass that cause a diminution in transmittance due to chemical modification of the glass structure. Damage of this kind is often reversible. Objectives designed specifically for the ultraviolet region are usually fabricated from quartz glass or calcium fluoride. Glasses made of these materials exhibit high transmittance in the ultraviolet region and are not modified by ultraviolet light. Irreversible damage nevertheless also occurs in these special objectives just as in standard objectives, becoming evident as gradual clouding, decreased transmittance, and degraded resolution. These difficulties have hitherto not been completely understood.

An additional difficulty occurs when an inspection microscope is equipped with an autofocus system, in which an autofocus light beam is coupled into the beam path of the inspection microscope and focused by the objective. Focusing is then performed, for example, by ascertaining the contrast of the image of the light reflected from the component being examined, using a four-quadrant photodiode. Since the inspection microscope must be usable in both visible light and ultraviolet light, the wavelength of the autofocus light must not lie within those regions in order to prevent the measurement operation from being influenced by light of the autofocus system. Since the sensitivity of semiconductor detectors is highest in the red to infrared region of the spectrum, it is advantageous to select an autofocus wavelength in that region. The optical properties of objectives are generally different for light of differing wavelengths; this complicates evaluation of the autofocus system signals, which as a result are erroneous.

SUMMARY OF THE INVENTION

It is therefore the object of the invention to describe an inspection microscope that has an autofocus device and that solves the problem stated above.

The aforementioned object is achieved by an inspection microscope which comprises:
- a light source, emitting light of a first wavelength below 400 nm for illumination of a specimen to be inspected,
- an objective that is composed of multiple optical components, wherein the objective has a numerical aperture and a focal length,
- a tube optical system,
- an autofocus device that directs light of a second wavelength onto the specimen, wherein the second wavelength is greater than 400 nm, wherein the objective shows an optical correction that eliminates the longitudinal chromatic aberrations with respect to the first and the second wavelength, and
- a cement-free mounting of all optical components.

It is an additional object of the present invention to create an objective which shows constant optical properties over the long term.

The aforesaid object is achieved by an objective that transmits light of a first wavelength below 400 nm and light of a second wavelength above 400 nm and comprises:
- multiple optical components, wherein the objective has a numerical aperture as well as a magnification,
- an optical correction that eliminates longitudinal chromatic aberrations with respect to the first and the second wavelength, and
- a cement-free mounting of all optical components.

The invention has the advantage that the inspection microscope and objective according to the present invention allow a specimen under inspection to be examined using ultraviolet and deep ultraviolet light with no occurrence of damage to the inspection microscope as a result. In addition, it is possible to use a universal autofocus device whose light is transmitted even when standard objectives are utilized.

It has been recognized that the irreversible damage occurring even in special objectives is brought about as a result of chemical modifications of the optical cement between the individual lens elements upon irradiation with ultraviolet light and in particular upon irradiation with deep ultraviolet light. Objectives known from the existing art that are corrected for more than one wavelength have hitherto had lens elements cemented to one another or cemented lens element groups. The present invention completely resolves this difficulty, and moreover is configured in such a way that with collimated entry, the intersection distance for the autofocus light and for the illuminating light is at least largely identical, so that the autofocus device functions reliably.

In a preferred embodiment, the optical components are lens elements that are largely transparent to the first and to the second wavelength. They are preferably fabricated from calcium fluoride or quartz glass or barium fluoride or lithium fluoride or strontium fluoride. In a particularly preferred embodiment, adjacent lens elements are produced from calcium fluoride and quartz glass, respectively.

In a concrete embodiment, the first wavelength is 248 nm and the second wavelength is 903 nm. For high-resolution applications in particular, objectives having a numerical aperture that is greater than 0.8 and a high magnification are particularly advantageous. This means that the focal length of the objective is preferably less than 3.5 mm for a working distance exceeding 0.15 mm.

In the inspection of masks having pellicles, in which context large unobstructed working distances are important, objectives that have an unobstructed working distance of at least 7 mm with a numerical aperture of at least 0.5 to 0.55 are very particularly advisable.

It is very particularly advantageous, especially with regard to the physical size of the objective, if the aberrations are not all corrected exclusively in the objective, but rather if an overall correction is achieved by the coaction of the objective and tube optical system. Only the longitudinal chromatic aberration in terms of the first and second wavelengths must be corrected in the objective, since the beam path of the light of the autofocus device does not pass through the tube optics. The correction for light of the second wavelength is, in particular, in fact limited to the center of the image.

The tube optical system preferably also contains no optical cement, and is configured in such a way that as a result of the coaction of the tube optical system and the objective, the longitudinal chromatic aberration of the objective is compensated for in the region less than 10 nm above and below the first wavelength. It is moreover particularly advantageous to configure the tube optics in such a way that as a result of the coaction of the tube optical system and the objective, the transverse chromatic error of the tube optical system is compensated for in the region less than 10 nm above and below the first wavelength.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
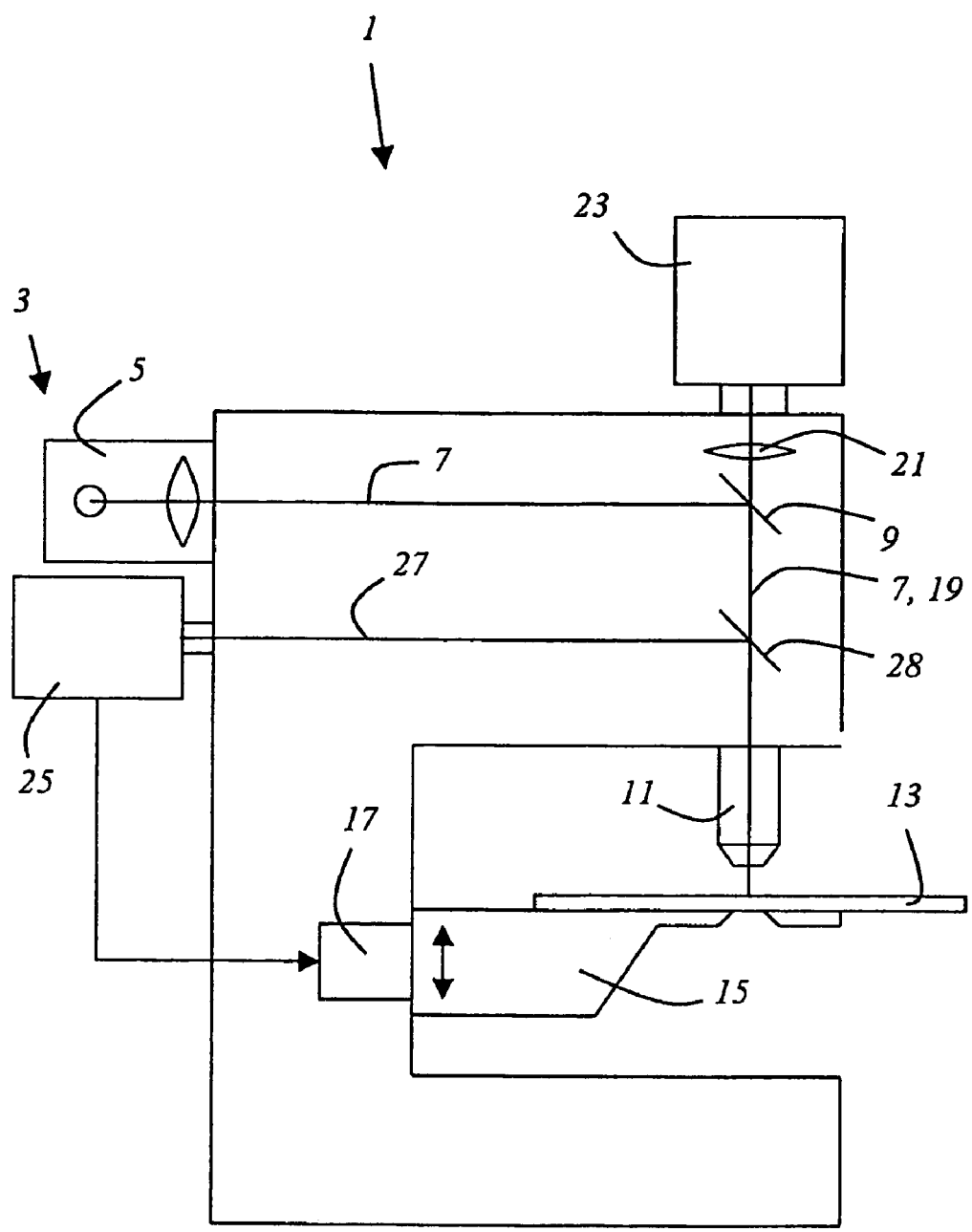
FIG. 1 shows an embodiment of the inspection microscope.

FIG. 1 shows an embodiment of inspection microscope 1 according to the present invention. A mercury lamp 5, which emits an illuminating light beam 7 of a first wavelength in the region from 243 to 266 nm, serves as light source 3. Illuminating light beam 7 is directed with the aid of a semitransparent mirror 9 to objective 11, and there focused onto a specimen 13 to be inspected. Specimen 13 is located on an X-Y precision positioning stage 15 that is movable along the illuminating light axis for focusing and is driven by an electric motor 17. Detected light 19 proceeding from the specimen passes via objective 11 and through semitransparent mirror 9 to tube optical system 21 which is assembled in cement-free fashion from multiple lens elements, and ultimately encounters a TV camera 23 whose image is displayed to the user on a monitor (not shown). The inspection microscope comprises an autofocus device 25 that, with the aid of a laser (not depicted), generates an autofocus light beam 27 of a second wavelength of 903 nm, which is coupled into the illuminating beam path with a dichroic beam splitter 28 and is focused by objective 11. The autofocus light reflected from the specimen passes through objective 11 and via dichroic beam splitter 28 back to the autofocus device, where it is directed onto a four-quadrant photodiode (not shown) whose electrical signals are electronically evaluated in order to assess the position of specimen 13 relative to the focal plane of objective 11. Autofocus device 25 controls electric motor 17 of precision positioning stage 13 in such a way that the surface of specimen 13 to be inspected lies in the focal plane of objective 11. Objective 11 contains exclusively lens elements assembled in cement-free fashion, and possesses, with collimated light entry, the same intersection distance with respect to the first and second wavelengths. It has a 150× magnification with a numerical aperture of 0.9. The longitudinal chromatic aberration of objective 11 in the region from 238 nm to 258 nm is compensated for by the opposite longitudinal chromatic aberration in tube optical system 21, and similarly for the transverse chromatic aberration.

Figure 2:
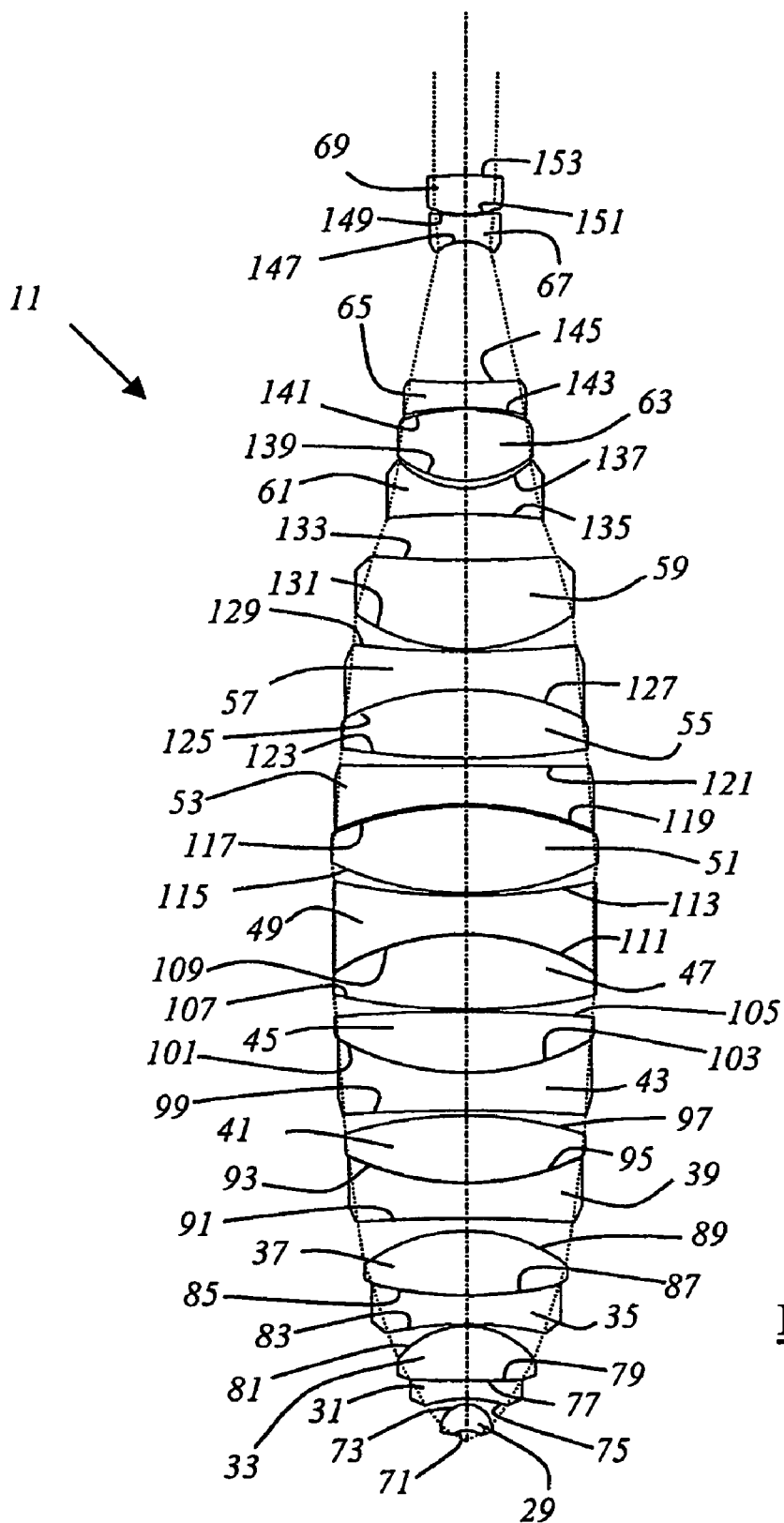
FIG. 2 shows the internal construction of an embodiment of the objective according to the present invention.

FIG. 2 shows the internal configuration of an embodiment of objective 11 that contains twenty-one lens elements labeled with reference characters 29 through 69. In combination with the tube optical system of 200 mm focal length shown in FIG. 9, objective 11 has a 150× magnification and a numerical aperture of 0.9. Lens elements 29–69 each have two boundary surfaces 71–153, and are each manufactured of quartz glass or calcium fluoride. Air gaps are present between lens elements 29–69. With collimated light entry, the objective has the same intersection distance of 0.418 mm for light of wavelengths 248 nm and 908 nm. The radii of curvature of boundary surfaces 71–153 of lens elements 29–69, and lass of the individual lens elements and their spacings from one be gathered from the following table:

| Lens element | Boundary surface | Radius/mm | Spacing/mm | Glass type |
|---|---|---|---|---|
| 29 | 71 | −1.0070 | 1.0200 | QUARTZ GLASS |
| 29 | 73 | −1.0070 | .2000 | |
| 31 | 75 | −5.1142 | .7000 | QUARTZ GLASS |
| 31 | 77 | 116.3432 | .0200 | |
| 33 | 79 | 116.3432 | 2.1000 | CAF2 |
| 33 | 81 | −3.3054 | .1000 | |
| 35 | 83 | 13.0257 | 1.1000 | QUARTZ GLASS |
| 35 | 85 | 15.2835 | .0200 | |
| 37 | 87 | 15.2835 | 2.5000 | CAF2 |
| 37 | 89 | −6.3932 | .5000 | |
| 39 | 91 | −63.2383 | 1.4000 | QUARTZ GLASS |
| 39 | 93 | 10.4603 | .0200 | |
| 41 | 95 | 10.4603 | 2.6000 | CAF2 |
| 41 | 97 | −15.0571 | .2000 | |
| 43 | 99 | −71.0504 | 1.5000 | QUARTZ GLASS |
| 43 | 101 | 9.8492 | .0200 | |
| 45 | 103 | 9.8492 | 2.4000 | CAF2 |
| 45 | 105 | −58.9093 | .1000 | |
| 47 | 107 | 23.1720 | 2.9000 | CAF2 |
| 47 | 109 | −9.2663 | .0200 | |
| 49 | 111 | −9.2663 | 1.5000 | QUARTZ GLASS |
| 49 | 113 | 23.9793 | .1000 | |
| 51 | 115 | 11.6587 | 3.4000 | CAF2 |
| 51 | 117 | −12.6456 | .1000 | |
| 53 | 119 | −12.6456 | 1.5000 | QUARTZ GLASS |
| 53 | 121 | 2610.3417 | .3000 | |
| 55 | 123 | 30.6023 | 2.7000 | CAF2 |
| 55 | 125 | −9.9195 | .0200 | |
| 57 | 127 | −9.9195 | 1.5000 | QUARTZ GLASS |
| 57 | 129 | 34.6720 | .1000 | |
| 59 | 131 | 7.0048 | 3.5000 | CAF2 |
| 59 | 133 | 41.7404 | 1.8000 | |
| 61 | 135 | −27.4055 | 1.0000 | QUARTZ GLASS |
| 61 | 137 | 3.5732 | .3000 | |
| 63 | 139 | 4.0071 | 2.8000 | CAF2 |
| 63 | 141 | −7.1920 | .0500 | |
| 65 | 143 | −9.8514 | 1.0000 | QUARTZ GLASS |
| 65 | 145 | 30.3842 | 5.5000 | |
| 67 | 147 | −1.7127 | 1.0000 | CAF2 |
| 67 | 149 | 10.6695 | .0500 | |
| 69 | 151 | 4.0356 | 1.5000 | QUARTZ GLASS |
| 69 | 153 | −18.3130 | inf. | |

Figure 3:
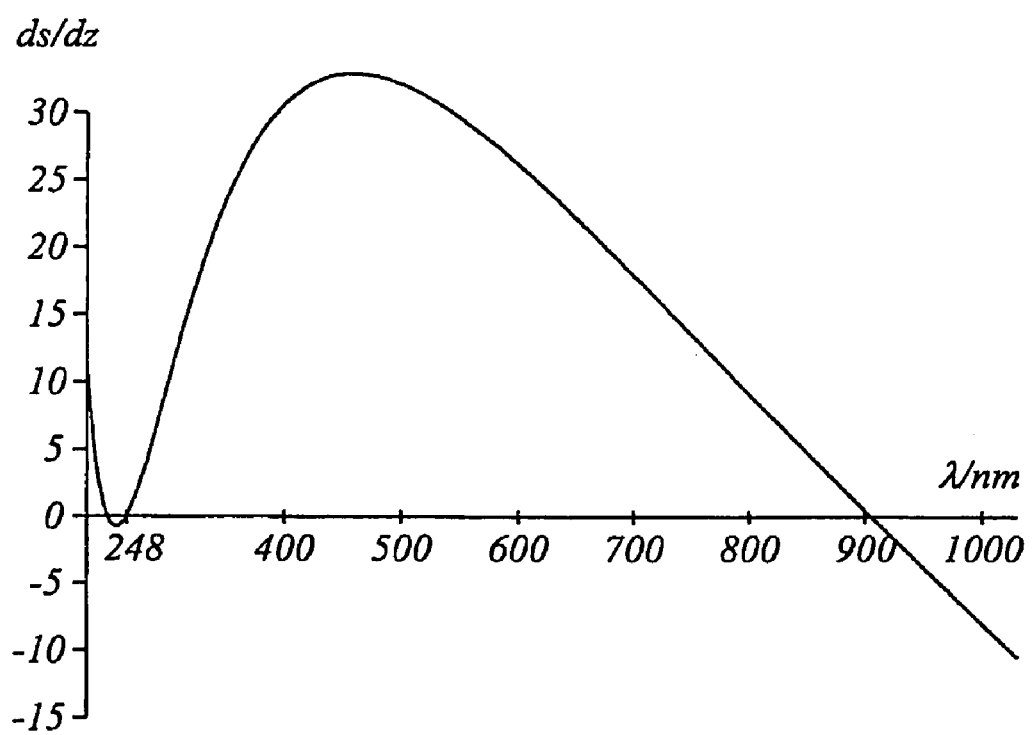
FIG. 3 is a graphic depiction of the relative intersection distance of the objective as a function of wavelength.

FIG. 3 shows, in a graphic depiction, the relative intersection distance of objective 11 as a function of wavelength λ. It is evident that in the region a few nanometers around 248 nm, a low longitudinal chromatic aberration exists. In an inspection microscope, this longitudinal chromatic aberration is preferably compensated for using a specially designed tube optical system, so that even broad-band light used in aberration-free fashion.

Figure 4:
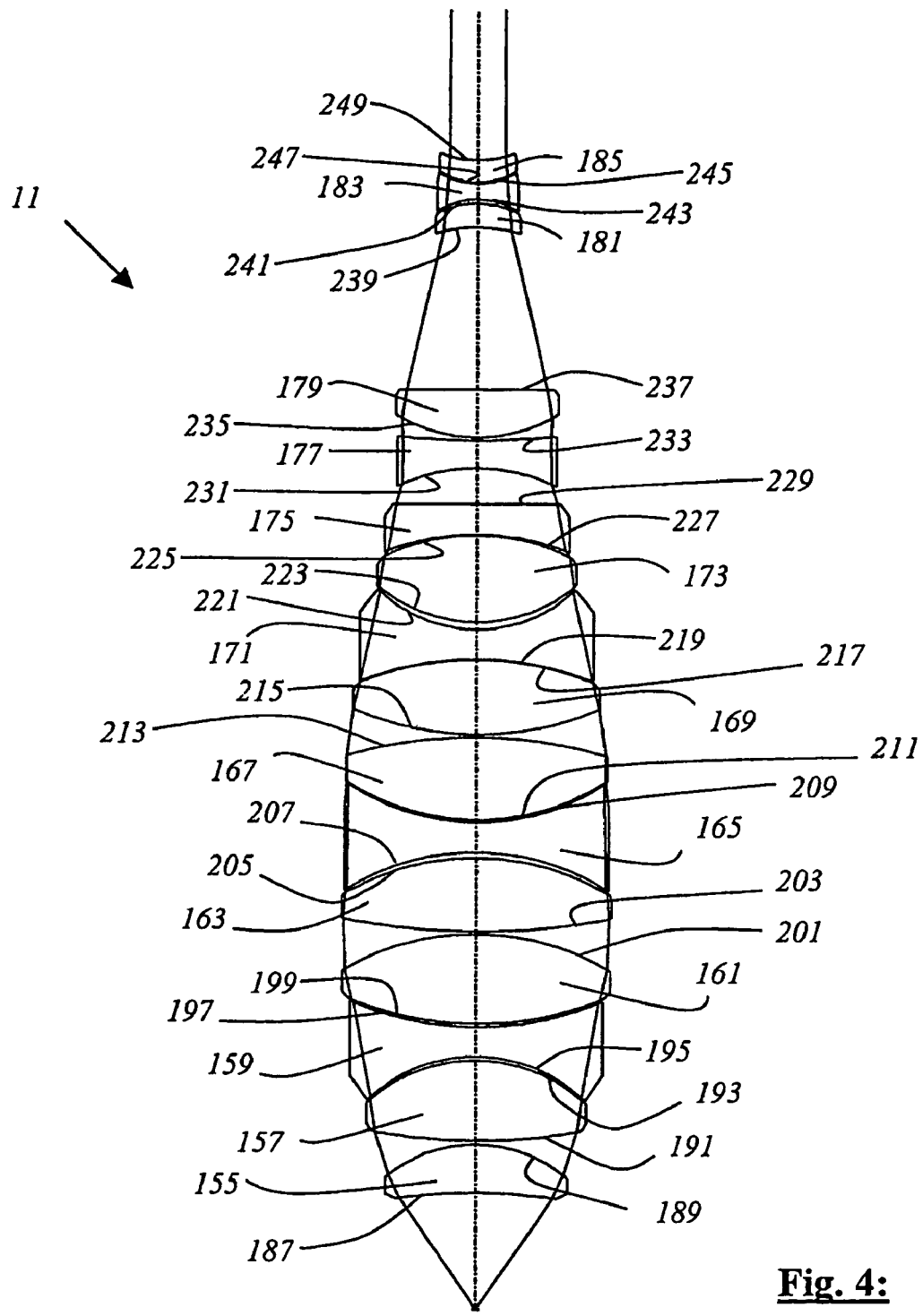
FIG. 4 shows the internal construction of a further embodiment of the objective according to the present invention.

FIG. 4 shows the internal configuration of a further embodiment of objective 11 that contains sixteen lens elements labeled with reference characters 155 through 185. In combination with the tube optical system of 200 mm focal length shown in FIG. 9, objective 11 has a 63× magnification and a numerical aperture of 0.55. Lens elements 155–185 each have two boundary surfaces 187–249, and are each manufactured of quartz glass or calcium fluoride. Air gaps are present between lens elements 155–185. With collimated beam entry, the objective has the same intersection distance of 7.7 mm for light of wavelengths 248 nm and 903 nm. The working distance is 7.0 mm. The radii of curvature of boundary surfaces 187–249 of lens elements 155–185, and the types of glass of the individual lens elements and their spacings from one another, may be gathered from the following table:

| Lens element | Boundary surface | Radius | Spacing | Glass type |
|---|---|---|---|---|
| 155 | 187 | −31.8610 | 3.2000 | QUARTZ |
| 155 | 189 | −8.9120 | .3000 | |
| 157 | 191 | 36.5170 | 5.3400 | CAF2 |
| 157 | 193 | −10.2030 | .2400 | |
| 159 | 195 | −9.9220 | 2.0000 | QUARTZ |
| 159 | 197 | 20.1110 | .2200 | |
| 161 | 199 | 21.2920 | 6.0200 | CAF2 |
| 161 | 201 | −16.4330 | .2000 | |
| 163 | 203 | 44.0460 | 4.9000 | CAF2 |
| 163 | 205 | −16.5100 | .3600 | |
| 165 | 207 | −15.6420 | 2.0000 | QUARTZ |
| 165 | 209 | 14.7420 | .1700 | |
| 167 | 211 | 15.1020 | 5.5000 | CAF2 |
| 167 | 213 | −29.4540 | .2000 | |
| 169 | 215 | 19.5190 | 5.0000 | CAF2 |
| 169 | 217 | −19.5190 | .0800 | |
| 171 | 219 | −19.5200 | 2.0000 | QUARTZ |
| 171 | 221 | 8.8780 | .5000 | |
| 173 | 223 | 9.6970 | 5.8000 | CAF2 |
| 173 | 225 | −13.2430 | .0700 | |
| 175 | 227 | −15.5050 | 2.0000 | QUARTZ |
| 175 | 229 | plane surface | 2.4010 | |
| 177 | 231 | −11.5420 | 1.8500 | QUARTZ |
| 177 | 233 | 48.0020 | .2000 | |
| 179 | 235 | 9.8410 | 3.2000 | CAF2 |
| 179 | 237 | plane surface | 10.7500 | |
| 181 | 239 | −10.1470 | 1.6000 | QUARTZ |
| 181 | 241 | −5.3040 | .2300 | |
| 183 | 243 | −4.8080 | 1.1000 | CAF2 |
| 183 | 245 | 4.8080 | .0700 | |
| 185 | 247 | 4.6630 | 1.4500 | QUARTZ |
| 185 | 249 | 7.1840 | inf. | |

Figure 5:
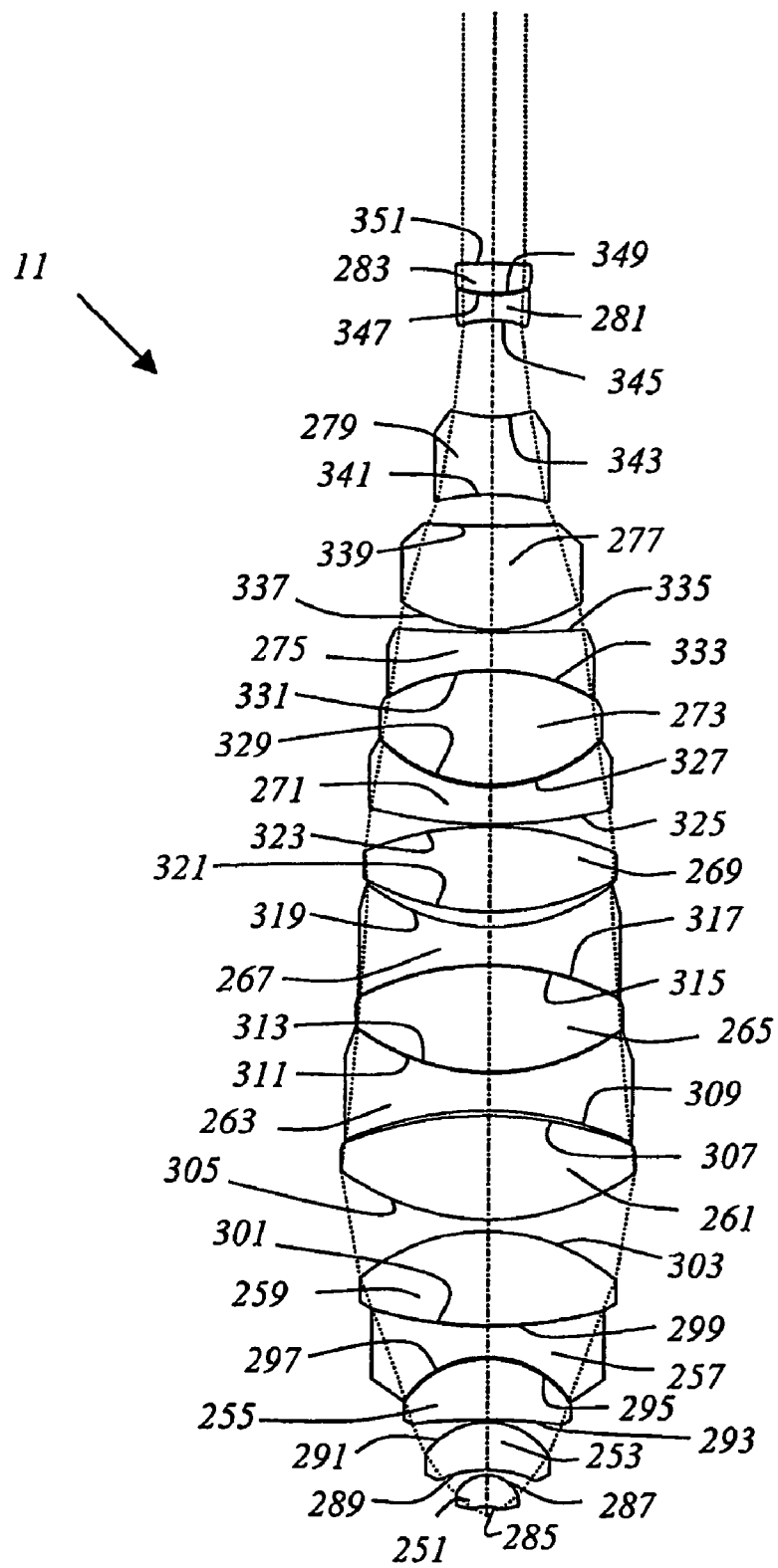
FIG. 5 shows the internal construction of a further embodiment of the objective according to the present invention.

FIG. 5 shows the internal configuration of a further embodiment of objective 11 that contains seventeen lens elements labeled with reference characters 251 through 282. In combination with the tube optical system of 200 mm focal length shown in FIG. 9, objective 11 has a 150× magnification and a numerical aperture of 0.90. Lens elements 251 through 283 each have two boundary surfaces 285–351, and are each manufactured of quartz glass or calcium fluoride. Air gaps are present between lens elements 251 through 283. With collimated beam entry, the objective has the same intersection distance of 0.364 mm for light of wavelengths 248 nm and 903 nm. The working distance is 0.2 mm. The radii of curvature of boundary surfaces 285–351 of lens elements 251 through 283, and the types of glass of the individual lens elements and their spacings from one another, may be gathered from the following table:

| Lens element | Boundary surface | Radius | Spacing | Glass type |
|---|---|---|---|---|
| 251 | 285 | −1.3020 | 1.2200 | QUARTZ GLASS |
| 251 | 287 | −1.3020 | .2000 | |
| 253 | 289 | −4.4850 | 1.8800 | CAF2 |
| 253 | 291 | −2.8770 | .1000 | |
| 255 | 293 | −25.3180 | 2.4000 | CAF2 |
| 255 | 295 | −3.9040 | .0800 | |
| 257 | 297 | −3.8810 | 1.2000 | QUARTZ GLASS |
| 257 | 299 | 16.8010 | .0310 | |
| 259 | 301 | 16.8010 | 3.7000 | CAF2 |
| 259 | 303 | −7.4810 | .5000 | |
| 261 | 305 | 9.4200 | 4.1500 | CAF2 |
| 261 | 307 | −14.1090 | .2000 | |

-continued

| Lens element | Boundary surface | Radius | Spacing | Glass type |
|---|---|---|---|---|
| 263 | 309 | −12.9970 | 1.5000 | QUARTZ GLASS |
| 263 | 311 | 8.4710 | .0380 | |
| 265 | 313 | 8.4720 | 4.1800 | CAF2 |
| 265 | 315 | −10.8320 | .0350 | |
| 267 | 317 | −10.8320 | 1.5000 | QUARTZ GLASS |
| 267 | 319 | 7.5030 | .6000 | |
| 269 | 321 | 10.0000 | 3.3500 | CAF2 |
| 269 | 323 | −12.2530 | .1000 | |
| 271 | 325 | 18.1250 | 1.5000 | QUARTZ GLASS |
| 271 | 327 | 5.8690 | .1000 | |
| 273 | 329 | 5.9510 | 4.5300 | CAF2 |
| 273 | 331 | −8.0360 | .0360 | |
| 275 | 333 | −8.0360 | 1.5000 | QUARTZ GLASS |
| 275 | 335 | 50.6020 | .1000 | |
| 277 | 337 | 6.3030 | 4.1000 | CAF2 |
| 277 | 339 | 48.0020 | 1.2100 | |
| 279 | 341 | −8.1590 | 3.1000 | QUARTZ GLASS |
| 279 | 343 | 5.4540 | 3.8000 | |
| 281 | 345 | −3.3030 | 1.0000 | CAF2 |
| 281 | 347 | 5.1430 | .0500 | |
| 283 | 349 | 4.6190 | 1.2000 | QUARTZ GLASS |
| 283 | 351 | −17.7680 | inf. | |

Figure 6:
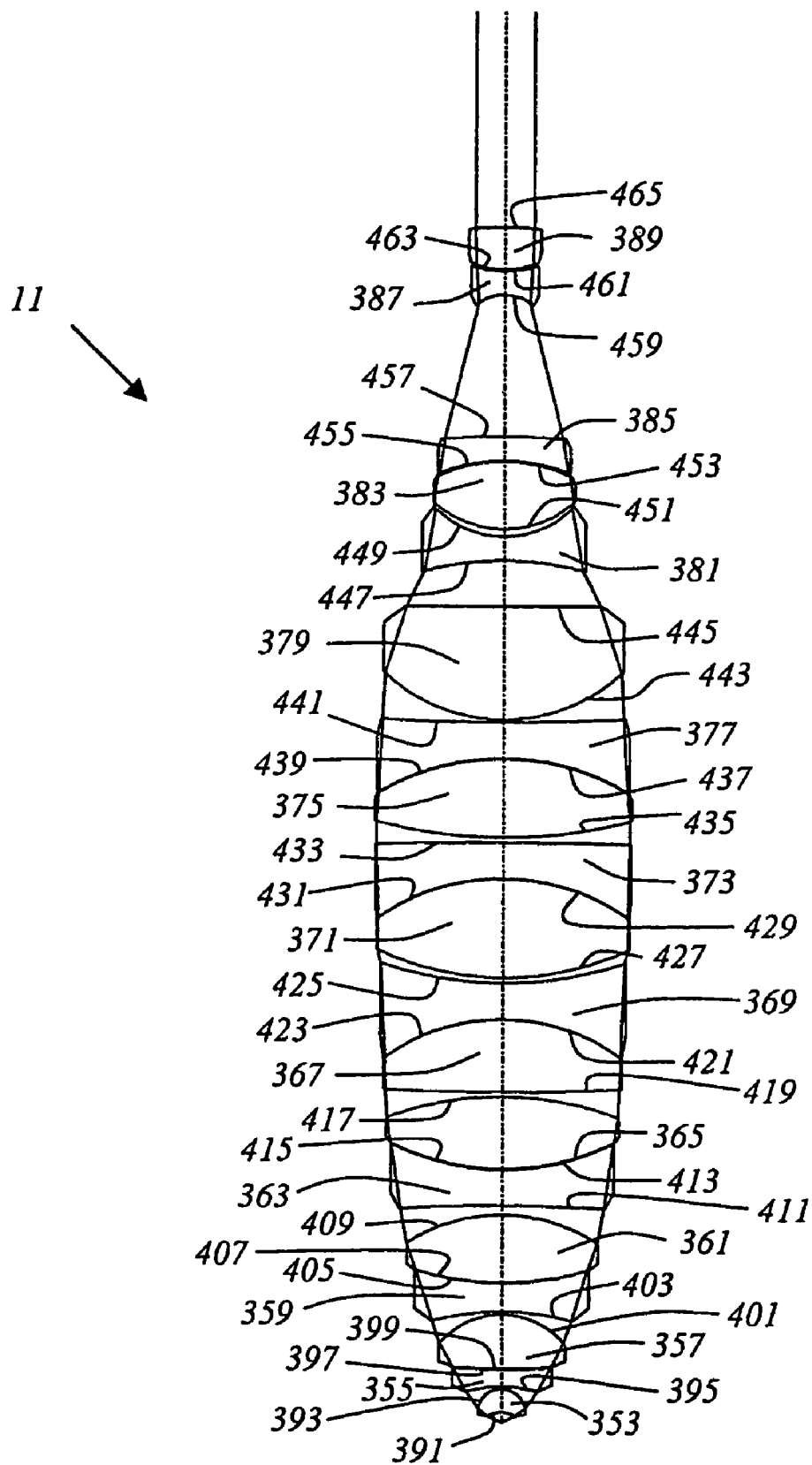
FIG. 6 shows the internal construction of a further embodiment of the objective according to the present invention.

FIG. 6 shows the internal configuration of a further embodiment of objective 11 that contains nineteen lens elements labeled with reference characters 353 through 389. In combination with the tube optical system of 200 mm focal length shown in FIG. 9, objective 11 has a 150× magnification and an aperture of 0.90. Lens elements 353 through 389 each have two boundary surfaces 391–465, and are each manufactured of quartz glass or calcium fluoride. Air gaps are present between lens elements 353 through 389. With collimated beam entry, the objective has the same intersection distance of 0.42 mm for light of wavelengths 248 nm and 903 nm. The working distance is 0.2 mm. The radii of curvature of boundary surfaces 391–465 of lens elements 353 through 389, and the types of glass of the individual lens elements and their spacings from one another, may be gathered from the following table:

| Lens element | Boundary surface | Radius | Spacing | Glass type |
|---|---|---|---|---|
| 353 | 391 | −1.0070 | .9600 | QUARTZ GLASS |
| | 393 | −.9500 | .1000 | |
| 355 | 395 | −5.4908 | .7000 | QUARTZ GLASS |
| | 397 | 27.0607 | .0200 | |
| 357 | 399 | 27.0607 | 2.2000 | CAF2 |
| | 401 | −3.2531 | .1000 | |
| 359 | 403 | −10.7848 | 1.2000 | QUARTZ GLASS |
| | 405 | 12.1721 | .0200 | |
| 361 | 407 | 12.1721 | 2.8000 | CAF2 |
| | 409 | −6.8280 | .4000 | |
| 363 | 411 | −64.0972 | 1.5000 | QUARTZ GLASS |
| | 413 | 9.8461 | .0200 | |
| 365 | 415 | 9.8461 | 3.0000 | CAF2 |
| | 417 | −12.9844 | .2000 | |
| 367 | 419 | 101.2944 | 3.0000 | CAF2 |
| | 421 | −7.8870 | .0200 | |
| 369 | 423 | −7.8870 | 1.5000 | QUARTZ GLASS |
| | 425 | 15.6216 | .2000 | |
| 371 | 427 | 11.8848 | 4.1000 | CAF2 |
| | 429 | −8.5251 | .0200 | |
| 373 | 431 | −8.5251 | 1.5000 | QUARTZ GLASS |
| | 433 | −140.7178 | .2000 | |
| 375 | 435 | 20.3658 | 3.3000 | CAF2 |
| | 437 | −9.4168 | .0200 | |
| 377 | 439 | −9.4168 | 1.5000 | QUARTZ GLASS |
| | 441 | 93.5331 | .1000 | |
| 379 | 443 | 6.9040 | 4.7000 | CAF2 |
| | 445 | 897.4094 | 1.9000 | |
| 381 | 447 | −11.6312 | 1.0000 | QUARTZ GLASS |
| | 449 | 3.7870 | .3000 | |
| 383 | 451 | 4.1771 | 2.8000 | CAF2 |
| | 453 | −6.0687 | .0500 | |
| 385 | 455 | −6.9364 | 1.0000 | QUARTZ GLASS |
| | 457 | −35.5321 | 5.8000 | |
| 387 | 459 | −1.7885 | 1.0000 | CAF2 |
| | 461 | 5.0394 | .0500 | |
| 389 | 463 | 3.5153 | 1.7000 | QUARTZ GLASS |
| | 465 | −17.9020 | inf. | |

Figure 7:
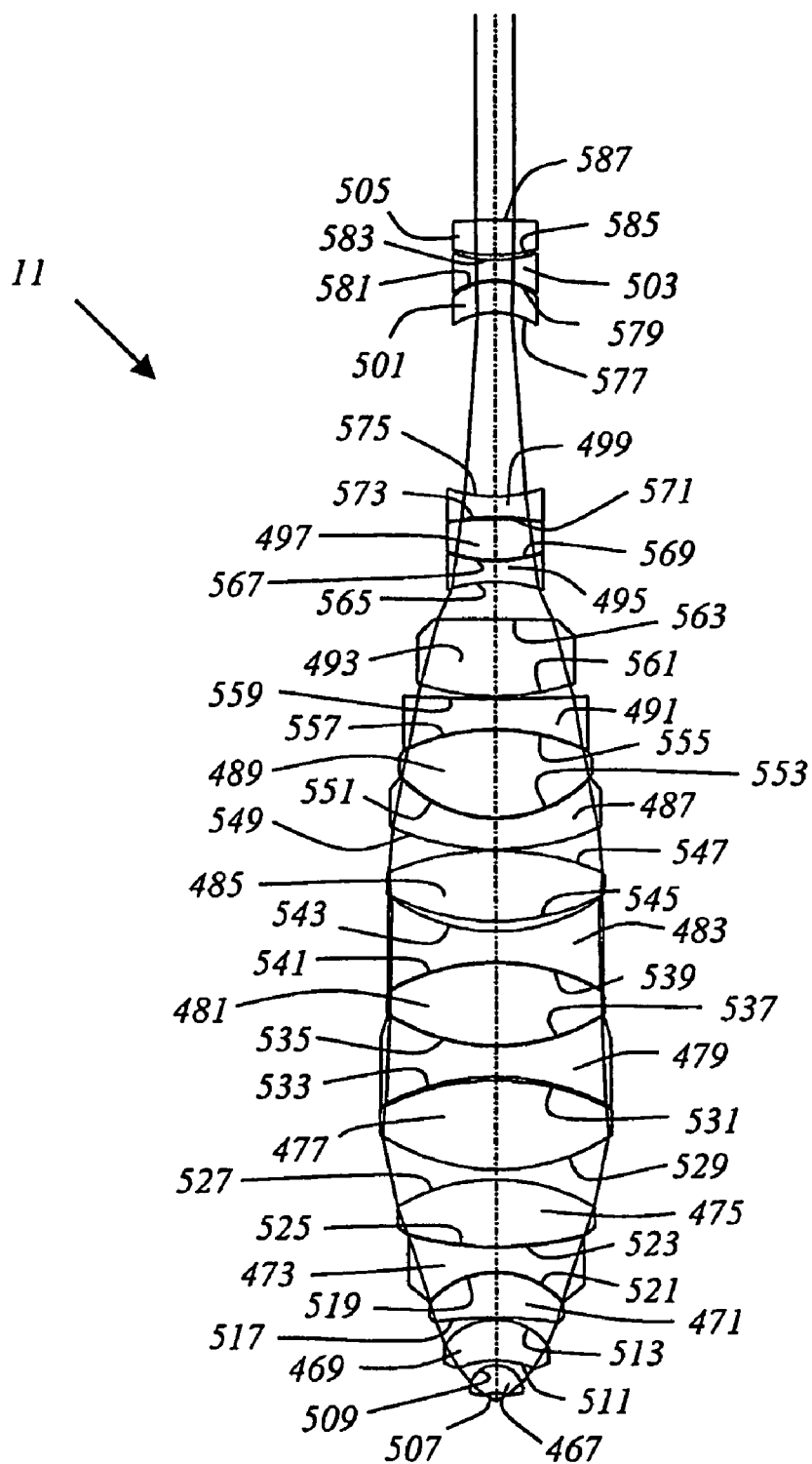
FIG. 7 shows the internal construction of a further embodiment of the objective according to the present invention.

FIG. 7 shows the internal configuration of a further embodiment of objective 11 that contains twenty lens elements labeled with reference characters 467 through 505. In combination with the tube optical system of 200 mm focal length shown in FIG. 9, objective 11 has a 200× magnification and an aperture of 0.90. Lens elements 467 through 505 each have two boundary surfaces 507–587, and are each manufactured of quartz glass or calcium fluoride. Air gaps are present between lens elements 467 through 505. With collimated beam entry, the objective has the same intersection distance of 0.384 mm for light of wavelengths 248 nm and 903 nm. The working distance is 0.2 mm. The radii of curvature of boundary surfaces 507–587 of lens elements 467 through 505, and the types of glass of the individual lens elements and their spacings from one another, may be gathered from the following table:

| Lens element | Boundary surface | Radius | Spacing | Glass type |
|---|---|---|---|---|
| 467 | 507 | −1.3406 | 1.3417 | QUARTZ GLASS |
| | 509 | −1.2832 | .2000 | |
| 469 | 511 | −4.6344 | 2.0000 | CAF2 |
| | 513 | −3.0395 | .1000 | |
| 471 | 517 | −19.1192 | 2.2000 | CAF2 |
| | 519 | −4.1705 | .0500 | |
| 473 | 521 | −4.2122 | 1.2000 | QUARTZ GLASS |
| | 523 | 15.2410 | .0500 | |
| 475 | 525 | 15.2410 | 3.3201 | CAF2 |
| | 527 | −8.9154 | .5000 | |
| 477 | 529 | 9.9453 | 4.3403 | CAF2 |
| | 531 | −11.5633 | .1570 | |
| 479 | 533 | −10.9741 | 1.5000 | QUARTZ GLASS |
| | 535 | 9.4708 | .0500 | |
| 481 | 537 | 9.4708 | 4.0274 | CAF2 |
| | 539 | −10.1508 | .0500 | |
| 483 | 541 | −10.1508 | 1.5000 | QUARTZ GLASS |
| | 543 | 8.4705 | .5016 | |
| 485 | 545 | 10.8133 | 3.4593 | CAF2 |
| | 547 | −12.9233 | .1000 | |
| 487 | 549 | 11.9103 | 1.5000 | QUARTZ GLASS |
| | 551 | 6.1198 | .0500 | |
| 489 | 553 | 6.1198 | 4.2788 | CAF2 |
| | 555 | −9.7847 | .0500 | |
| 491 | 557 | −9.7847 | 1.5000 | QUARTZ GLASS |
| | 559 | 92.3864 | .1000 | |
| 493 | 561 | 11.5539 | 3.8000 | CAF2 |
| | 563 | −62.2415 | 1.8263 | |
| 495 | 565 | −6.2817 | 1.0000 | QUARTZ GLASS |
| | 567 | 7.3680 | .0500 | |
| 497 | 569 | 6.8762 | 2.0000 | CAF2 |
| | 571 | −14.6005 | .1151 | |
| 499 | 573 | −12.1375 | 1.0000 | QUARTZ GLASS |
| | 575 | 6.8053 | 9.0000 | |

-continued

| Lens element | Boundary surface | Radius | Spacing | Glass type |
|---|---|---|---|---|
| 501 | 577 | −3.6630 | 1.5000 | QUARTZ GLASS |
|  | 579 | −3.0606 | .0500 |  |
| 503 | 581 | −3.7004 | 1.0000 | CAF2 |
|  | 583 | 6.1983 | .1993 |  |
| 505 | 585 | 7.5116 | 1.7000 | QUARTZ GLASS |
|  | 587 | −33.0000 | inf. |  |

Figure 8:
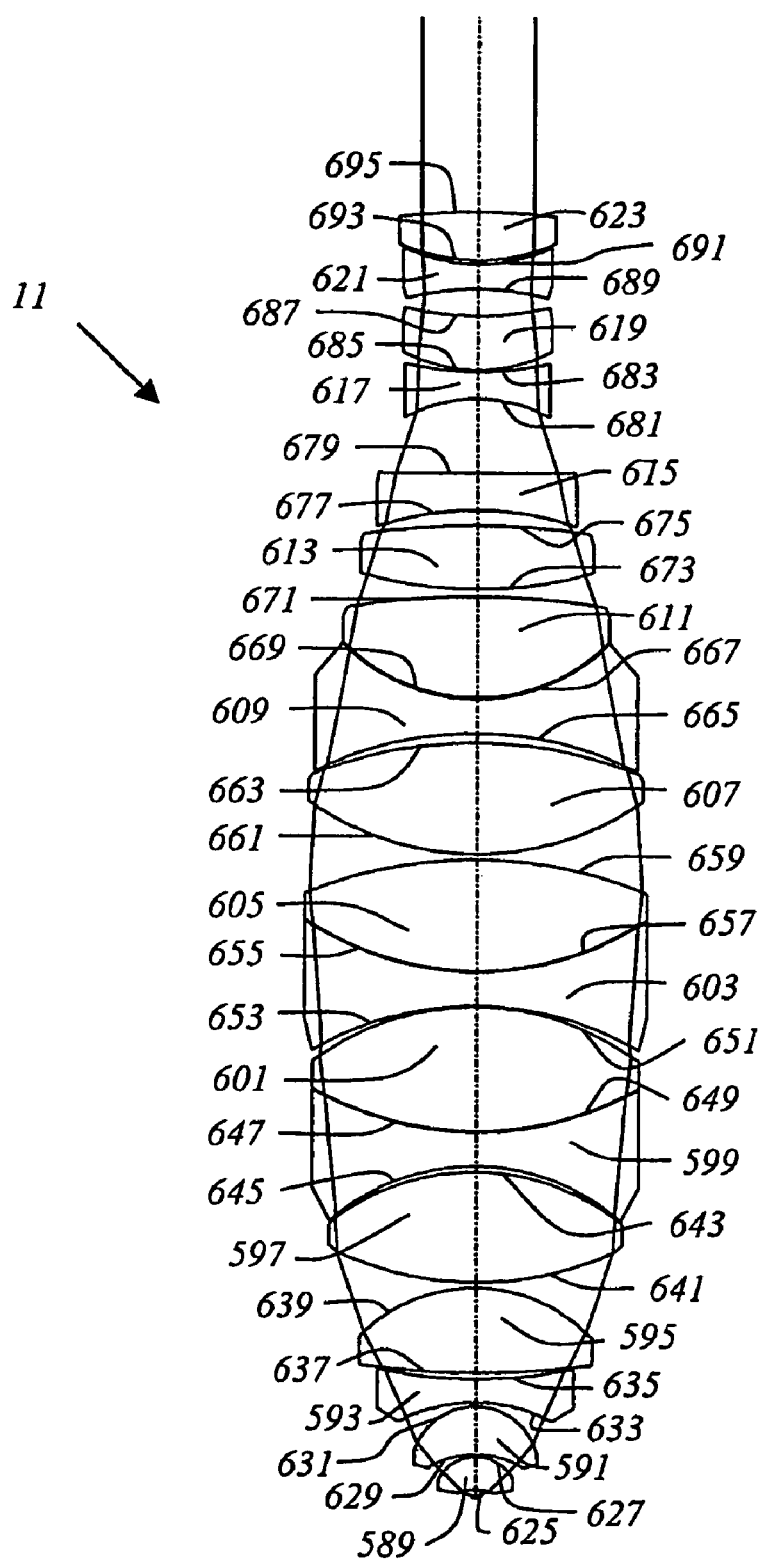
FIG. 8 shows the internal construction of a further embodiment of the objective according to the present invention.

FIG. 8 shows the internal configuration of a further embodiment of objective 11 that contains twenty lens elements labeled with reference characters 589 through 623. In combination with the tube optical system of 200 mm focal length shown in FIG. 9, objective 11 has a 63× magnification and an aperture of 0.90. Lens elements 589 through 623 each have two boundary surfaces 625–695, and are each manufactured of quartz glass or calcium fluoride. Air gaps are present between lens elements 589 through 623. With collimated beam entry, the objective has the same intersection distance of 0.417 mm for light of wavelengths 248 nm and 903 nm. The working distance is 0.2 mm. The radii of curvature of boundary surfaces 625–695 of lens elements 589 through 623, and the types of glass of the individual lens elements and their spacings from one another, may be gathered from the following table:

| Lens element | Boundary surface | Radius | Spacing | Glass type |
|---|---|---|---|---|
| 589 | 625 | −2.1244 | 1.7200 | QUARTZ GLASS |
|  | 627 | −2.1486 | .1000 |  |
| 591 | 629 | −4.6685 | 2.5000 | CAF2 |
|  | 631 | −3.2430 | .2000 |  |
| 593 | 633 | −8.3322 | 1.2000 | QUARTZ GLASS |
|  | 635 | 25.1850 | .3268 |  |
| 595 | 637 | 43.3114 | 4.4000 | CAF2 |
|  | 639 | −8.1452 | .3000 |  |
| 597 | 641 | 16.8037 | 5.7000 | CAF2 |
|  | 643 | −11.6783 | .2968 |  |
| 599 | 645 | −11.0103 | 1.8000 | QUARTZ GLASS |
|  | 647 | 16.4439 | .0500 |  |
| 601 | 649 | 16.4439 | 6.5000 | CAF2 |
|  | 651 | −13.6015 | .0500 |  |
| 603 | 653 | −16.2615 | 1.8000 | QUARTZ GLASS |
|  | 655 | 15.3763 | .0500 |  |
| 605 | 657 | 15.3763 | 5.7500 | CAF2 |
|  | 659 | −22.5022 | .3000 |  |
| 607 | 661 | 14.5691 | 5.8000 | CAF2 |
|  | 663 | −21.6045 | .4808 |  |
| 609 | 665 | −17.9557 | 1.8000 | QUARTZ GLASS |
|  | 667 | 9.2065 | .1088 |  |
| 611 | 669 | 9.3059 | 5.3000 | CAF2 |
|  | 671 | −38.5138 | .4000 |  |
| 613 | 673 | 21.6588 | 3.3000 | CAF2 |
|  | 675 | −37.7818 | .8000 |  |
| 615 | 677 | −15.4376 | 1.9000 | QUARTZ GLASS |
|  | 679 | 356.4300 | 3.8480 |  |
| 617 | 681 | −7.5117 | 1.4000 | QUARTZ GLASS |
|  | 683 | 15.5540 | .1000 |  |
| 619 | 685 | 8.1444 | 2.8000 | CAF2 |
|  | 687 | 16.3383 | 1.4000 |  |
| 621 | 689 | −13.4675 | 1.3000 | CAF2 |
|  | 691 | 8.6117 | .1736 |  |
| 623 | 693 | 9.6434 | 2.5000 | QUARTZ GLASS |
|  | 695 | −33.000 | inf. |  |

Figure 9:
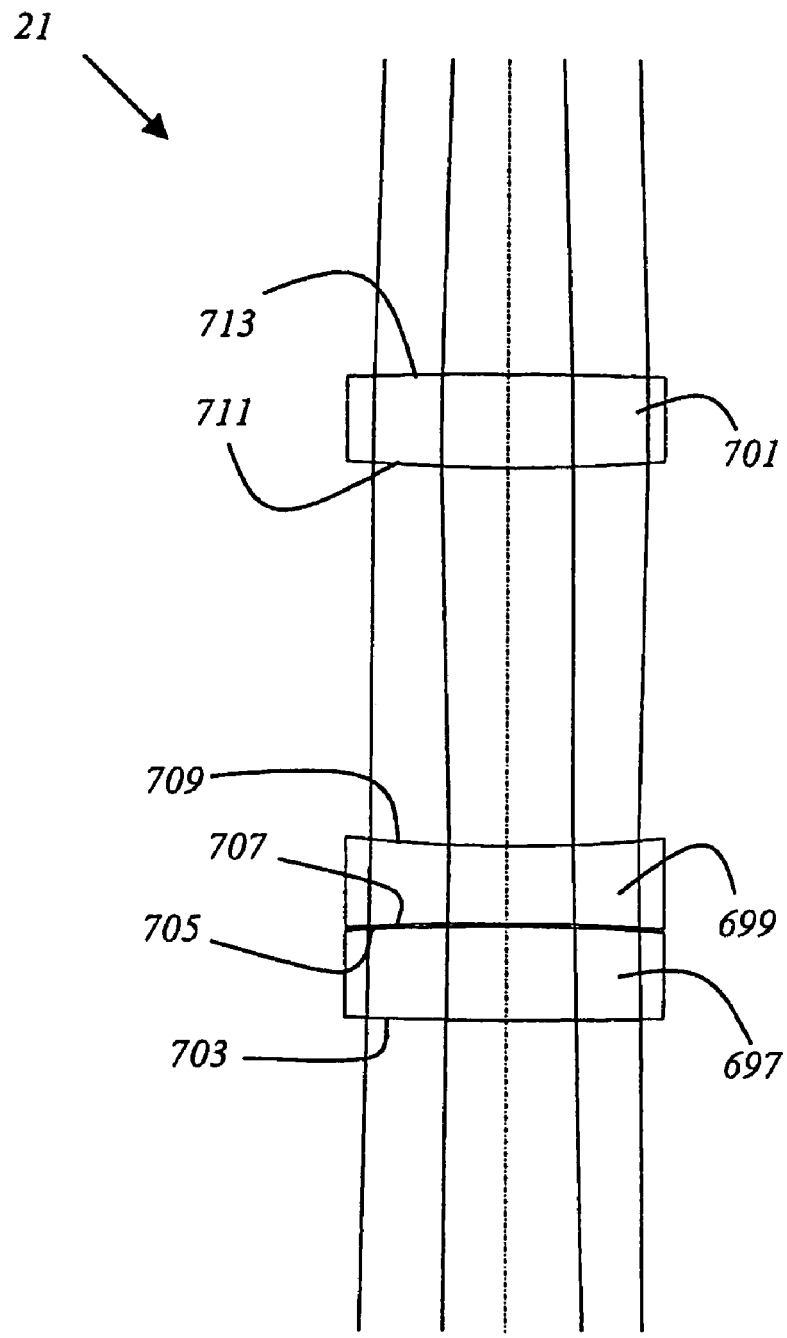
FIG. 9 shows the internal construction of a tube optical system.

FIG. 9 shows the internal configuration of tube optical system 21, which contains three lens elements labeled with reference characters 697 through 701. Tube optical system 21 has a focal length of 200 mm at 248 nm. Lens elements 697 through 701 each have two boundary surfaces 703–713, and are each manufactured of quartz glass or calcium fluoride. Air gaps are present between lens elements 697 through 701. Tube optical system 21 contains no cement, and is configured in such a way that as a result of the coaction of tube optical system 21 and objective 11, the longitudinal chromatic error of objective 11 is compensated for in the region 10 nm above and below the first wavelength. In addition, tube optical system 21 is embodied in such a way that as a result of the coaction of tube optical system 21 and objective 11, the transverse chromatic error of tube optical system 21 is compensated for in the region less than 10 nm above and below the first wavelength. The radii of curvature of boundary surfaces 703–713 of lens elements 697 through 701, and the types of glass of the individual lens elements and their spacings from one another, may be gathered from the following table:

| Lens element | Boundary surface | Radius | Spacing | Glass type |
|---|---|---|---|---|
| 697 | 703 | 174.9820 | 3.0000 | Quartz glass |
|  | 705 | −60.4200 | 12.1575 |  |
| 699 | 707 | −44.6500 | 2.5000 | CaF2 |
|  | 709 | 76.1030 | .1000 |  |
| 701 | 711 | 76.1030 | 3.0000 | Quartz glass |
|  | 713 | −191.4220 | 169.6484 |  |

The invention has been described with reference to a particular embodiment. It is nevertheless self-evident that changes and modifications can be made without thereby leaving the range of protection of the claims recited hereinafter.

What is claimed is:

1. An inspection microscope comprising:
   a light source, emitting light of a first wavelength below 400 nm for illumination of a specimen to be inspected,
   an objective comprising multiple optical components, wherein the objective has a numerical aperture greater than 0.55 and a focal length less than 3.5 mm,
   a tube optical system,
   an autofocus device that directs light of a second wavelength onto the specimen, wherein the second wavelength is greater than 400 nm, wherein the objective shows an optical correction that eliminates longitudinal chromatic aberrations with respect to the first and the second wavelengths, and
   a cement-free and contactless mounting of all optical components of the objective such that a gap is provided between adjacent optical components.

2. The inspection microscope as defined in claim 1, wherein the optical components are lens elements.

3. The inspection microscope as defined in claim 2, wherein at least one lens element of the objective is fabricated from calcium fluoride or quartz glass or barium fluoride or lithium fluoride or strontium fluoride.

4. The inspection microscope as defined in claim 1, wherein an air gap is provided between at least two optical components.

5. The inspection microscope as defined in claim 1, wherein aberrations are corrected by the coaction of the objective and tube optical system.

6. The inspection microscope as defined in claim 1, wherein the tube optical system contains lens elements assembled in cement-free fashion.

7. The inspection microscope as defined in claim 1, wherein the tube optical system is configured in such a way that as a result of the coaction of the tube optical system and objective, the longitudinal chromatic error of the objective is compensated for in a region less than 10 nm above and below the first wavelength.

8. The inspection microscope as defined in claim 1, wherein the tube optical system is configured in such a way that as a result of the coaction of the tube optical system and the objective, the transverse chromatic error of the tube optical system is compensated for in a region less than 10 nm above and below the first wavelength.

9. The inspection microscope as defined in claim 1, wherein the first wavelength lies in a region from 243 nm to 266 nm.

10. The inspection microscope as defined in claim 9, wherein the first wavelength is 248 nm.

11. The inspection microscope as defined in claim 1, wherein the second wavelength is greater than 800 nm.

12. The inspection microscope as defined in claim 11, wherein the second wavelength is 903 nm.

13. The inspection microscope as defined in claim 1, wherein the tube optical system does not contain cemented lens elements.

14. An objective that transmits light of a first wavelength below 400 nm and light of a second wavelength above 400 nm comprises:

multiple optical components, wherein the objective has a numerical aperture as well as a magnification, wherein the numerical aperture is greater than 0.55 and the focal length is less than 3.5 mm, an optical correction that eliminates longitudinal chromatic aberrations with respect to the first and the second wavelengths, and a cement-free and contactless mounting of all optical components such that a gap is provided between adjacent optical components.

15. The objective as defined in claim 14, wherein the optical components are lens elements.

16. The objective as defined in claim 15, wherein at least one lens element of the objective is fabricated from calcium fluoride or quartz glass or barium fluoride or lithium fluoride or strontium fluoride.

17. The objective as defined in claim 14, wherein the first wavelength lies in the region from 243 nm to 266 nm.

18. The objective as defined in claim 18, wherein the first wavelength is 248 nm.

19. The objective as defined in claim 14, wherein the second wavelength is greater than 800 nm.

20. The objective as defined in claim 19, wherein the second wavelength is 903 nm.

* * * * *